US00RE33936E

United States Patent [19]

Miyamori et al.

[11] E Patent Number: Re. 33,936

[45] Reissued Date of Patent: May 26, 1992

[54] ELECTRONIC BLACKBOARD APPARATUS

[75] Inventors: Nobuyuki Miyamori; Yoshiaki Tomofuji, both of Saitama; Kiyosato Izawa, Tokyo; Youichi Tsuchida, Saitama, all of Japan

[73] Assignee: Wacom Co., Ltd., Tokyo, Japan

[21] Appl. No.: 448,041

[22] Filed: Dec. 8, 1989

Related U.S. Patent Documents

Reissue of:

[64] Patent No.: 4,711,977
Issued: Dec. 8, 1987
Appl. No.: 1,740
Filed: Jan. 9, 1987

[30] Foreign Application Priority Data

Jan. 9, 1986 [JP] Japan ..... 61-2736
Jan. 24, 1986 [JP] Japan ..... 61-13515

[51] Int. Cl.[5] ..... G08C 21/00
[52] U.S. Cl. ..... 178/18
[58] Field of Search ..... 178/18, 19; 324/207, 324/208; 382/64; 40/446, 449; 434/365; 340/286 R

[56] References Cited

U.S. PATENT DOCUMENTS

| | | | |
|---|---|---|---|
| 3,761,620 | 9/1973 | Graven | 178/18 |
| 4,609,776 | 9/1986 | Murakami et al. | 178/18 |
| 4,617,515 | 10/1986 | Taguchi et al. | 324/207 |
| 4,631,356 | 12/1986 | Taguchi et al. | 178/19 |
| 4,634,973 | 1/1987 | Murikami | 178/18 |
| 4,658,373 | 4/1987 | Murakami et al. | 364/559 |
| 4,670,751 | 6/1987 | Enokido et al. | 340/706 |
| 4,678,870 | 7/1987 | Taguchi et al. | 178/19 |
| 4,697,050 | 9/1987 | Farel et al. | 178/18 |
| 4,697,244 | 9/1987 | Murakami et al. | 364/520 |
| 4,704,501 | 11/1987 | Taguchi et al. | 178/19 |
| 4,709,209 | 11/1987 | Murakami et al. | 324/207 |
| 4,845,478 | 7/1989 | Taguchi et al. | 340/712 |

*Primary Examiner*—Stafford D. Schreyer
*Attorney, Agent, or Firm*—Lowe, Price, LeBlanc & Becker

[57] ABSTRACT

An electronic blackboard apparatus comprises an electronic blackboard unit, a writing instrument, a position-detecting control unit, and an output section. When video information such as characters and figures is depicted on a writing surface by means of the writing instrument, a magnetic bias with a locus corresponding to the video information is simultaneously applied to a position-detecting tablet of the electronic blackboard unit. Position coordinates thereof are computed by the position-detecting control unit and converted into electric signals. Similarly, when the video information on the writing surface is erased by means of the eraser, a magnetic bias with a locus corresponding to the erased video information is simultaneously applied to the position-detecting tablet. Position coordinates thereof are calculated by the position-detecting control unit and converted into electric signals. On the basis of these electric signals, the video information on the writing surface is output from the output section as a hard-copy image or as a display image.

40 Claims, 11 Drawing Sheets

(A)

(A)

(B)

(A)

(B)

(A)

(B)

ELECTRONIC BLACKBOARD APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electronic blackboard apparatus in which video information is depicted on a writing surface by means of a writing instrument and is simultaneously converted into electric signals by an electromagnetic converting means, the blackboard apparatus being capable of outputting an image similar to the video information on the basis of the electric signals.

2. Description of the Prior Art

Conventional apparatus of this type include one sort in which light is applied to a writing surface consisting of a windable sheet on which video information is written while the sheet is being wound up, the reflected light being detected by an image sensor or the like, and another sort in which a position-detecting section using matrix-like pressure-sensitive rubber is provided on the rear side of a writing surface which is made flexible so as to detect the writing pressure by means of detection voltage.

However, with such arrangements, measures must be taken to ensure that the winding-type sheet does not become deformed at the time of writing, and, in the case of the writing pressure type, a reinforcing structure must be adopted to provide strength sufficient to resist deformation due to the writing pressure. Consequently, the weight of the apparatus is necessarily large and the range of use of the writing surface is restricted. In addition, there has been a problem in that it becomes difficult to write on the writing surface because of repeated deformation of the writing surface due to external forces, and, hence, there has been a problem of limited durability.

SUMMARY OF THE INVENTION

Accordingly, a primary object of the present invention is to provide an electronic blackboard apparatus which is lightweight and outstanding in durability.

To this end, the present invention provides, in accordance with one aspect of the invention, an electronic blackboard apparatus, comprising: an electronic blackboard unit having a surface plate made of a non-magnetic material, the surface of which is formed as a writing surface capable of being used repeatedly and a position-detecting tablet for detecting position coordinates of a local magnetic bias applied via the surface plate; a writing instrument having a core member for displaying video information including characters and figure on the writing surface and a magnetism generator for applying a magnetic bias to the position-detecting tablet when the core member is in contact with the writing surface; an eraser having an erasing member for erasing the video information including the characters and figure on the writing surface and a magnetism generator for applying a magnetic bias to the position-detecting tablet when the erasing member is in contact with the writing surface; a position-detecting control unit for driving the position-detecting tablet and for computing the position coordinates of the writing instrument and the eraser; and an output section for outputting the video information of the writing surface.

In accordance with this aspect of the present invention, if the writing instrument is operated on the writing surface of the electronic blackboard unit, video information such as characters and figure is displayed on the writing surface by means of the core member of the writing instrument. At the same time, a magnetic bias with a locus corresponding to the video information is applied to the position-detecting tablet. Position coordinates thereof are calculated by the position-detecting control unit and converted into electric signals. If the eraser is similarly operated, the video information on the writing surface is erased by the erasing member of the eraser. Simultaneously, a magnetic bias with a locus corresponding to the erased video information is applied to the position-detecting tablet. Position coordinates thereof are calculated by the position-detecting control unit and converted into electric signals. Position coordinates identical with those of the video information on the writing surface are obtained on the basis of these electric signals. Furthermore, the video information is output from the output section as a hard copy, or as a display image on a display, or to another device through a communication line, as necessary.

Accordingly, since position coordinates can be fetched merely by applying a local magnetic bias to the position-detecting tablet of the electronic blackboard unit, it is not necessary to apply a large physical force on the writing surface, as is the case with the apparatus of the pressure-sensitive type. In addition, since the magnetism generator merely moves on the writing surface together with the writing instrument and the like, the writing surface can be made similar to that of an ordinary blackboard. Therefore, in comparison with the apparatus of the conventional optical system and pressure-sensitive type, the blackboard unit can be made outstanding in durability, and can be thin and light in weight. In addition, another advantage is offered by the fact that the writing instrument can be used with the same writing pressure as that of a generally used marker.

Another object of the present invention is to provide an eraser for use with an electronic blackboard apparatus which is capable of compiling data for automatically processing a portion to be erased on the electronic blackboard.

To this end, the present invention provides, in accordance with another aspect of the invention, an eraser for use with an electronic blackboard in which each position in a writing region is defined by X coordinates and Y coordinates using each one end of the writing region in the X- and Y-directions as reference positions and reaching each other end thereof, a writing position is indicated with the use of a writing instrument, and a written image is processed electronically, the eraser comprising: position-indicating means provided in the vicinity of opposite end portions of the surfaces of an erasing member contacting a writing surface and adapted to indicate first and second positions; and inclination-discriminating means for discriminating to which side a straight line connecting the first and second positions is inclined using an X-axis or a Y-axis on the writing surface as a reference line.

According to this aspect of the invention, since the inclination of a straight line based on coordinates at two points by means of the position-indicating means is determined in cases where the configuration of the surface of the eraser contacting the writing surface is, for instance, rectangular, other than a circular shape. Therefore, by establishing a given range around a straight line connecting the two points on the basis of the size of the eraser, it is possible to detect the range actually being erased.

A further object of the present invention is to provide an eraser for use with an electronic blackboard which, when an eraser is used partially, is capable of detecting a range of erasure corresponding to a small range thereof.

To this end, the present invention provides, in accordance with a further aspect of the invention, an eraser for use with an electronic blackboard in which each position in a writing region is defined by X coordinates and Y coordinates using each one end of the writing region in the X- and Y-directions as reference positions and reaching each other end thereof, a writing position is indicated with the use of a writing instrument, and a written image is processed electronically, the eraser comprising: position-indicating means provided in the vicinity of opposite end portions of the surfaces of an erasing member contacting a writing surface and adapted to indicate first and second positions; inclination-discriminating means for discriminating to which side a straight line connecting the first and second positions is inclined using an X-axis or a Y-axis on the writing surface as a reference line; and at least two switches actuating when the erasing member comes into contact with the writing surface and adapted to indicate an erasing position by a combination with an indication of the position-indicating means.

The other objects and features of the present invention will become apparent from the following detailed description of the invention when read in conjunction with the accompanying drawings.

DESCRIPTION OF THE PREFERRED EMBODIMENTS

Figure 1:
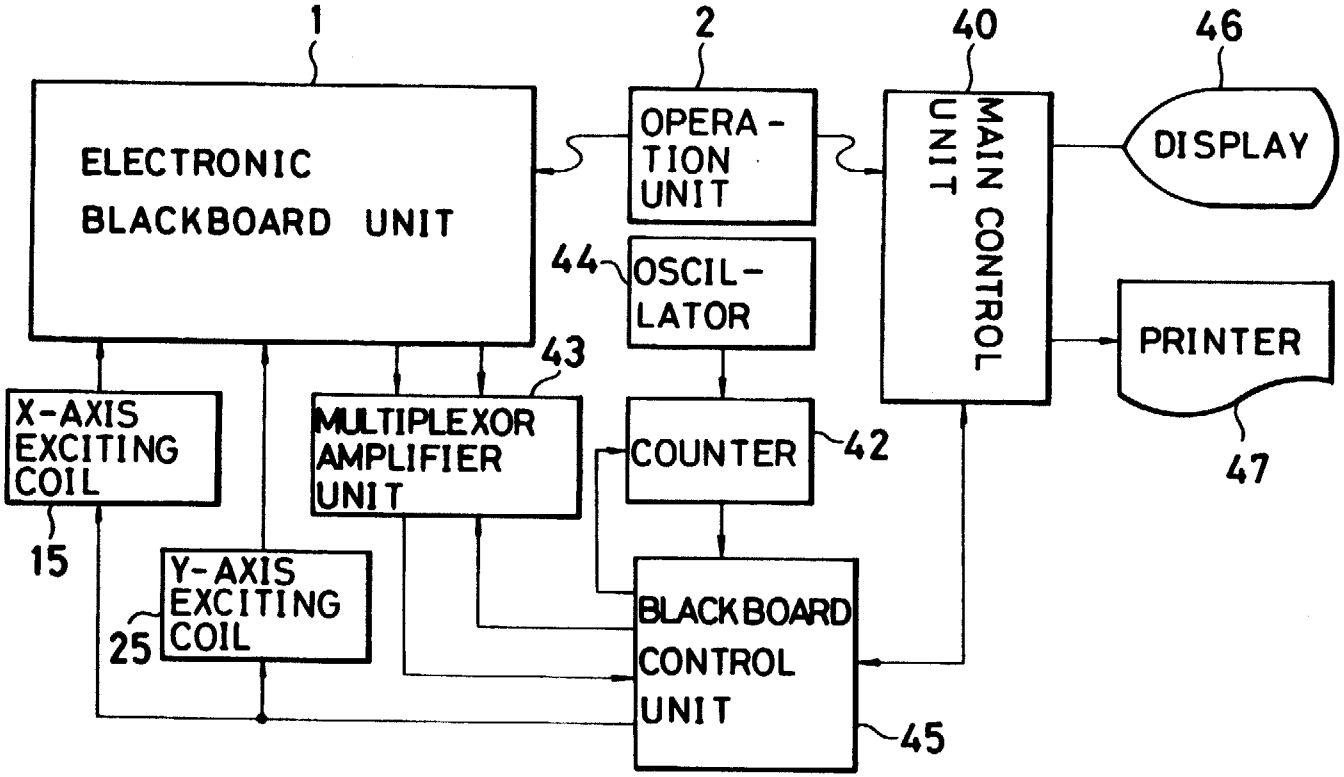
FIG. 1 is a schematic block diagram illustrating an embodiment of the present invention.
Figure 2:
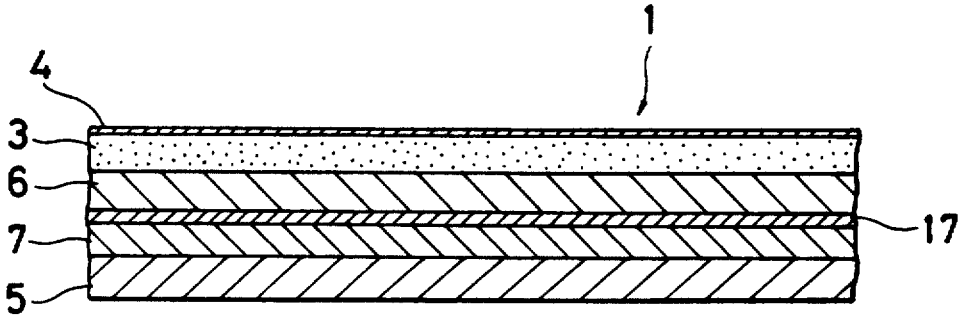
FIG. 2 is a cross sectional view of an electronic blackboard unit.

With reference to a cross-sectional view of FIG. 2, an electronic blackboard 1 has a base material 3 constituted by a flat plate made of asbestos, calcium silicate, urethane foams, or the like, and a surface plate 4 is provided thereon. The surface plate 4 is constituted by non-magnetic material such as aluminum or austenitic stainless steel, its surface being an enamel-finished flat surface which is used repeatedly by writing thereon with a marker or the like and by erasing with an eraser. An assembly 6 of first magnetostrictive transmission medium elements as shown in FIG. 3 and an assembly 7 of second magnetostrictive transmission medium elements as shown in FIG. 4 are installed between the surface plate 4 and a rear plate 5.

Figure 3:
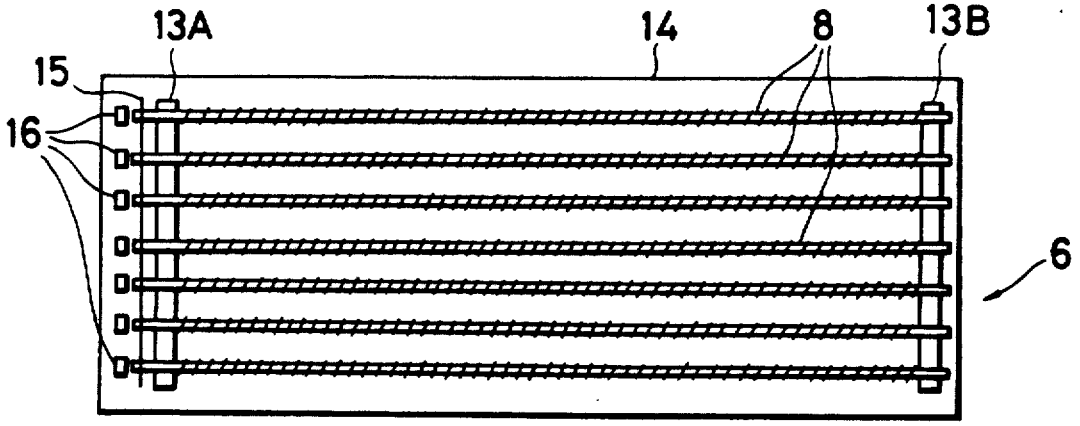
FIG. 3 is a diagram illustrating an assembly of first magnetostrictive transmission medium elements.
Figure 4:
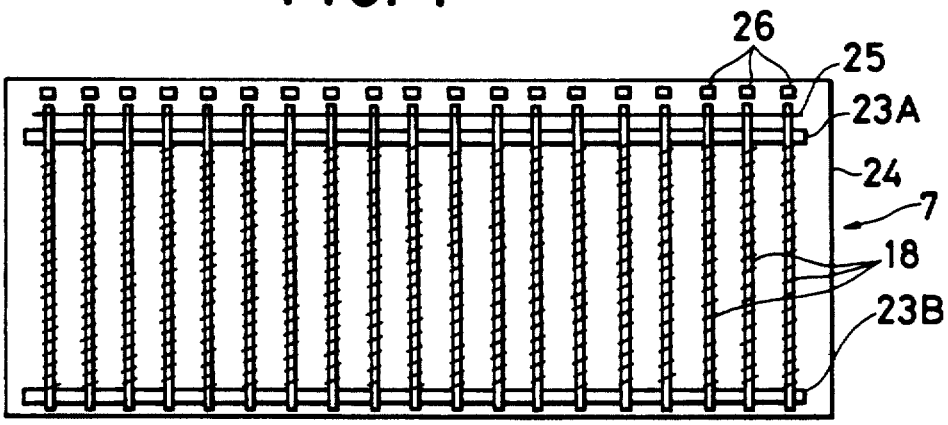
FIG. 4 is a diagram illustrating an assembly of second magnetostrictive transmission medium elements.
Figure 5:
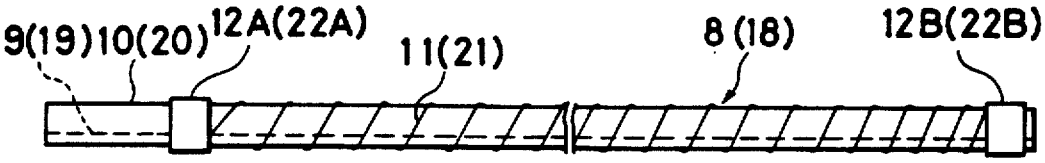
FIG. 5 is a structural diagram of a position detecting member.

One of a plurality of rows of position-detecting members 8, shown in FIG. 3, is illustrated in FIG. 5 and is constituted by the first magnetostrictive transmission medium element 9, a reinforcing member 10 for reinforcing the same, a coil 11 for fetching an induced voltage based on magnetostrictive vibration waves of the first magnetostrictive transmitting medium element 9, and so forth. The first magnetostrictive transmission medium element 9 is constituted by an iron-based amorphous alloy, and one having a width of 2 mm and a thickness of 0.02 mm is used in this embodiment.

Metal fittings 12A, 12B are for fixing the position-detecting members 8 to respective fitting plates 13A, 13B. The fitting plates 13A, 13B are secured to a supporting plate 14. In the state in which these components are assembled, the first magnetostrictive transmission medium elements 9 are parallel to each other, and their assembly constitutes a first planar array layer.

An exciting coil 15 is wound around each end of the first magnetostrictive transmission medium elements 9 so as to commonly excite each of the magnetostrictive transmission medium elements 9. Biasing magnets 16 impart biasing magnetic fields to portions of the magnetostrictive transmission medium elements 9 in the vicinity of the coil 15 so that the electromechanical coupling factor in the magnetostrictive transmitting medium elements 9 will become large, thereby allowing large magnetostrictive vibration waves to be produced with a small electric current.

Figure 6:
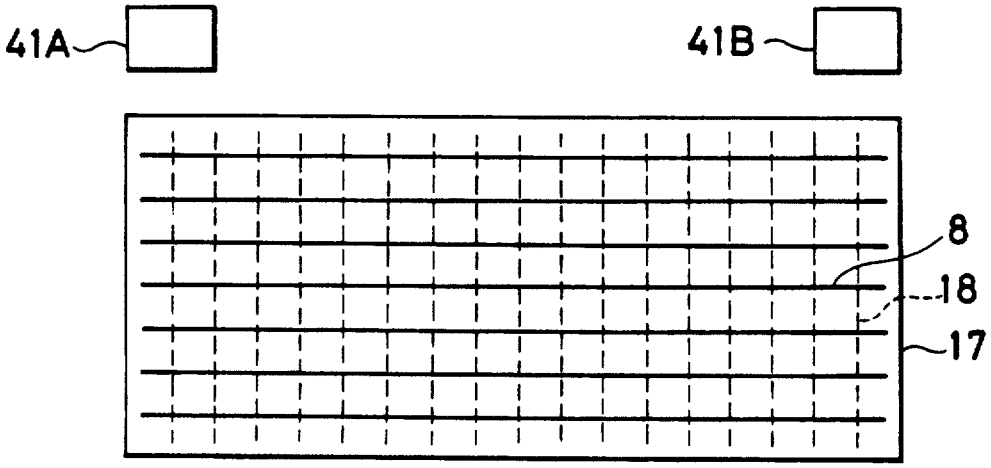
FIG. 6 is a diagram illustrating a state in which first and second position detecting members are assembled.

The assembly 7 of the second magnetostrictive transmission medium element has an arrangement equivalent to that of the assembly 6 of the first magnetostrictive transmission medium elements, and is superposed on the assembly 6 using a spacer 17 as shown in FIG. 6. Since respective members 19–26, including position-detecting members 18, are equivalent to the aforementioned members 9–16, description thereof will be omitted. Incidentally, the sections constituted by these members 9–16 or 19–26 will be referred to as position-detecting tablets.

FIG. 6 shows a state in which the respective assemblies 6, 7 of the first and second magnetostrictive transmission medium elements are assembled in layers, as shown in FIG. 2. The position-detecting members 8 are arranged in rows in such a manner that the linear direction thereof coincides with the X-direction of the writing surface plate 4, and that the direction of the position-detecting members 18 coincides with the Y-direction thereof. These position-detecting members 8, 18 are arranged to cover substantially the entire area of the writing surface plate 4.

Figure 7:
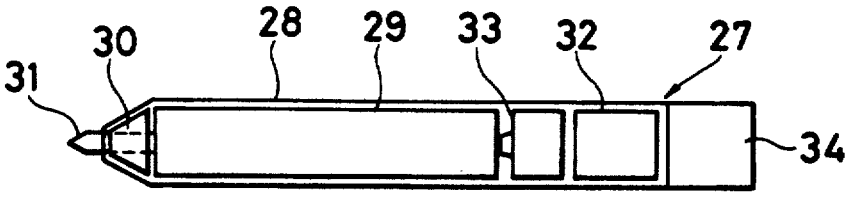
FIG. 7 is a structural diagram of a writing instrument.

A writing instrument 27, shown in FIG. 7, constitutes a part of an operation assembly 6 and is arranged such that a commercially available marker 29 is accommodated in a case 28 made of a non-magnetic metal, and a hollow truncated cone-shaped position-detecting magnet 30 with a core member 31 of the marker 29 inserted therethrough is also fitted in the case 28. A magnetic flux thereof is directed to the tip of the core member 31 so as to reach the magnetostrictive transmission medium elements 9, 19. An emitted light-controlling portion 32 has a battery and a light-emitting element (neither are shown). When the core member 31 is depressed during a writing operation and a switch 33 is thereby actuated, the light-controlling portion 32 applies modulated infrared rays peculiar to the writing instrument in all directions from a light-emitting window 34 during this time.

Figure 8:
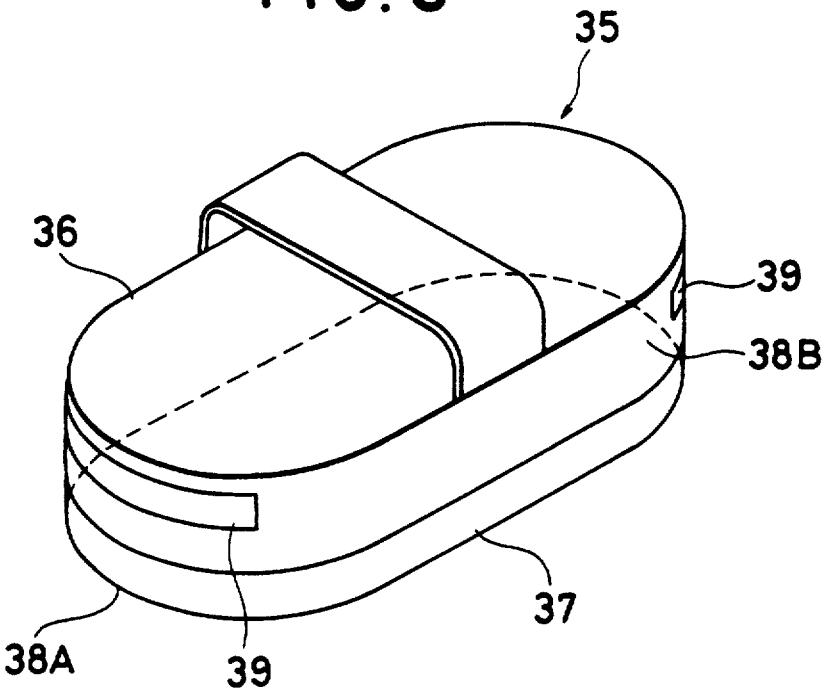
FIG. 8 is a schematic diagram of an eraser.

An eraser 35, shown in FIG. 8, constitutes the operation unit 2 together with the writing instrument 27, and has a battery and an emitted light-controlling portion (neither are shown) in a synthetic resin-made case 36. In addition, position-detecting magnets having the same function as that of the magnet 30 shown in FIG. 7 as well as corresponding switches (not shown) which respectively form pairs with said magnets are provided at both end portions 38A, 38B in the lower portion of an erasing member 37, made of a material such as sponge. When the end portion 38A or 38B of the erasing member 37 is depressed, the switch on the depressed side is actuated, and infrared rays modulated in correspondence with each of the switches is applied through two windows 39 provided in the case 36. Also, when both switches are depressed simultaneously, infrared rays which are modulated correspondingly are applied.

A main control unit 40 controls this apparatus in a comprehensive manner. Infrared ray-receiving portions 41A, 41B, shown in FIG. 6, are provided in the upper portion of the surface plate 4 of the electronic blackboard unit 1 so as to receive infrared rays applied from the writing instrument 27 or the eraser 35. Signals from these light-receiving portions 41A, 41B are supplied to the main control unit 40.

A counter 42 receives an induced voltage alternately from the coil 11 or 12 of the electronic blackboard unit 1 via a multiplexor amplifier unit 43 and counts pulses generated by a clock pulse generator 44 from the time when an X-axis exciting coil 15 or a Y-axis exciting coil 25 is excited until an induced voltage is generated by the position-detecting magnet 30 or the like.

When the writing instrument 27 or the eraser 35 is being operated (i.e., during reception of light), a blackboard control unit 45 alternately excites the X-axis exciting coil 15 and the Y-axis exciting coil 25 at predetermined intervals on the basis of an instruction from the main control unit 40. At the same time, the blackboard control unit 45 changes over the output of the multiplexor amplifier unit 43 to the coil 11 or 12 corresponding to the excitation and, on each such occasion, supplies the count of the counter 42 to the main control unit 40.

The main control unit 40 computes the position of the position-detecting magnet 30 and the like on the basis of data on the coil 11 with respect to the X-axis and on the basis of data on the coil 21 with respect to the Y-axis from enumerated data thereof, a peculiar frequency (e.g., 100 MHz) of the clock pulse generator 44, and the propagation speed (approx. 5,000 m/sec) of magnetostrictive vibration waves in the magnetostrictive transmission medium elements 9 and 19.

For instance, when writing is carried out, the infrared ray-receiving portions 41A, 41B receive infrared rays which indicate that writing is being effected. When the position-detecting magnet 30 is moved as writing is continued, the position coordinates thereof are consecutively computed and accumulated.

The same applies to a case where the eraser 35 is operated. In this case, a judgment is made that the eraser 35 is being used, and coordinates at the positions used are computed consecutively, and the relevant coordinates in the accumulated coordinates are eliminated. The remaining coordinates after being thus input or eliminated are displayed on a display 46, recorded as a hard copy by a printer 47, or output to another apparatus via a telephone line or the like, as necessary.

Incidentally, the eraser 35 in this case is provided with two position-detecting magnets. When two of them are in contact with the writing surface of the surface plate 4, the main control unit 40 computes the position of a straight line connecting the respective positions from coordinates concerning these two positions in a manner similar to that described above, establishes the range to be eliminated on the basis of the straight line, computes portions to be eliminated with the movement of the straight line, and eliminates the relevant coordinates in the accumulated coordinates.

In addition, in the above-described embodiment, the main control unit 40, the counter 42, the multiplexor amplifier unit 43, the generator 44, and the blackboard control unit 45 constitute a position-detecting section, while the display 46 and the printer 47 constitute an output section.

A second embodiment of an eraser will be described hereafter. An electronic blackboard 101 is arranged such that magnetostrictive transmission medium elements 103 are installed in layers on the rear surface of a writing surface 102 shown in FIG. 11 in an imaginative manner such as to form layers constituted by an assembly in the X-direction and an assembly in the Y-direction. An exciting coil 104 is commonly wound around each one end of the assemblies and a detection coil 105 for fetching an induced voltage based on magnetostrictive vibration waves is wound around each magnetostrictive transmitting medium element. Incidentally, in FIG. 10, for the sake of simplification, one assembly is shown in the form of a single member, and control of one assembly is shown.

If a pulse current is applied to the exciting coil 104 from an excitation control unit Ex to excite the same on the basis of a pulse signal applied from a control unit CONT at predetermined cycles, magnetostrictive vibration waves occur in portions of the magnetostrictive transmission medium elements 103 in the vicinity of the exciting coil 104, and the vibration waves are directed to the other ends and reach the same at high speed (approximately 5,000 m/sec). At this time, if the writing instrument (not shown) is in contact with the writing surface 102, a position-indicating magnet 106 provided in the vicinity of the core member thereof imparts a magnetic flux toward the indicated positions at each of the magnetostrictive transmission medium elements 103 in the X- and Y-directions. When the magnetostrictive vibration waves reach the relevant positions, a predetermined peak voltage is induced in the detection coil 105. A comparator CP1 compares the detected signal of the detection coil 105 with a reference level ER, and outputs an "H" level signal when the former exceeds the latter.

The aforementioned pulse signal is also supplied to flip-flops FF1, FF2 and resetting terminals R of counters CT1, CT2. Simultaneously with the excitation by the excitation control unit Ex, the pulse signal sets the negation-side outputs Q of the flip-flops FF1, FF2 to the "H" level, opens AND gates G1, G2, and starts to count the clock pulses of a clock generator CL by means of the counters CT1, CT2.

At that time, when the magnetostrictive vibration waves reach the position of the magnet 106, the comparator CP1 assumes the "H" level. The flip-flop FF1 is in the "H" level since its terminal J has received a potential Vcc, the flip-flop FF1 is set when its terminal K receives the "H" level signal, and the counter CT1 stops its counting operation.

Through program control, the control unit CONT computes coordinates at the position of the magnet 106 from its enumerated data, the frequency of the clock generator CL, and the magnetostrictive propagating speed. Incidentally, although the counter CT2 also counts, its enumerated data is not adopted when the writing instrument is used.

Figure 9:
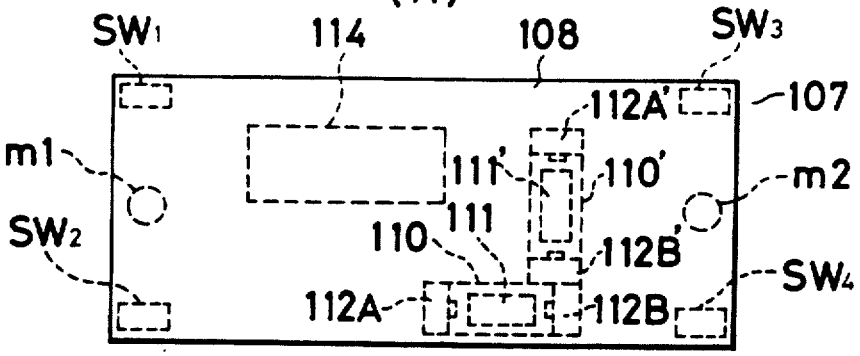
FIGS. 9(A) and 9(B) are schematic diagrams of an eraser in accordance with another embodiment of the present invention.
Figure 9:
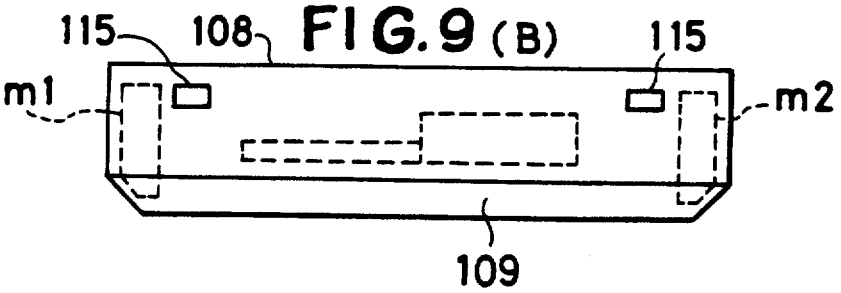

FIGS. 9(A) and 9(B) are schematic diagrams of a rectangular eraser which illustrates a second embodiment of the present invention. As for an erasing member 109 provided at the lower portion of a synthetic resin-made case 108, if the aforementioned core member of the writing instrument is a marker, one in which felt is wound around sponge or the like is used.

Figure 10:
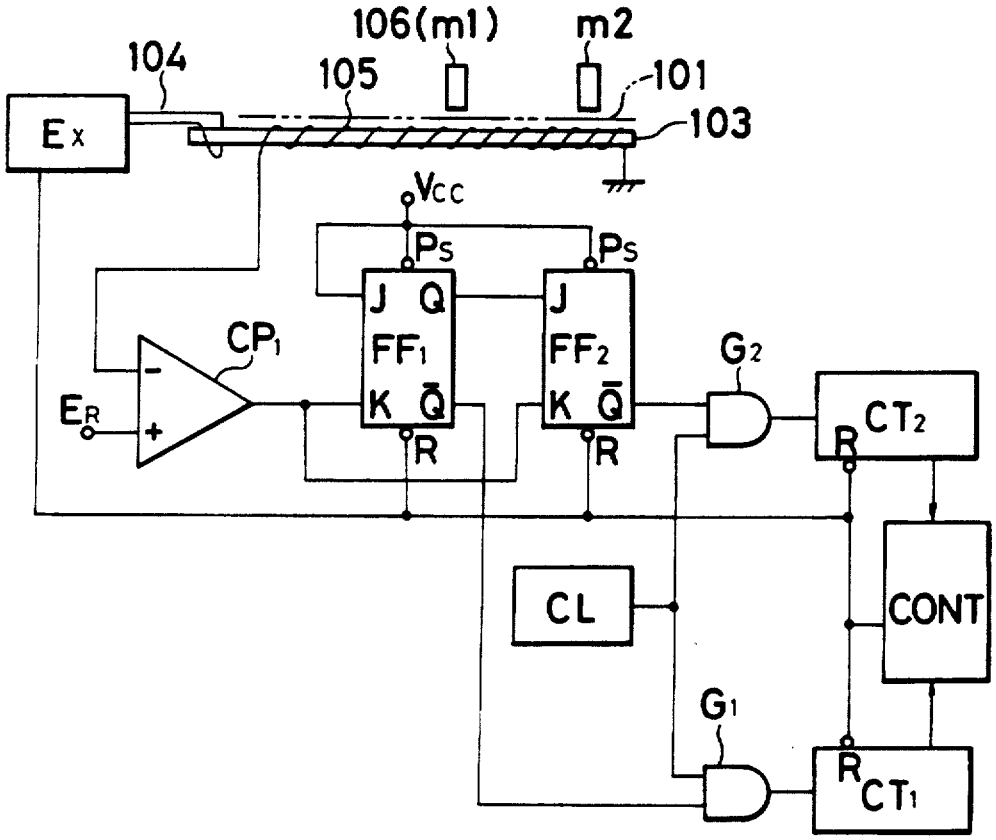
FIG. 10 is a specific circuit diagram of an electronic blackboard which uses the eraser shown in FIG. 9.
Figure 11:
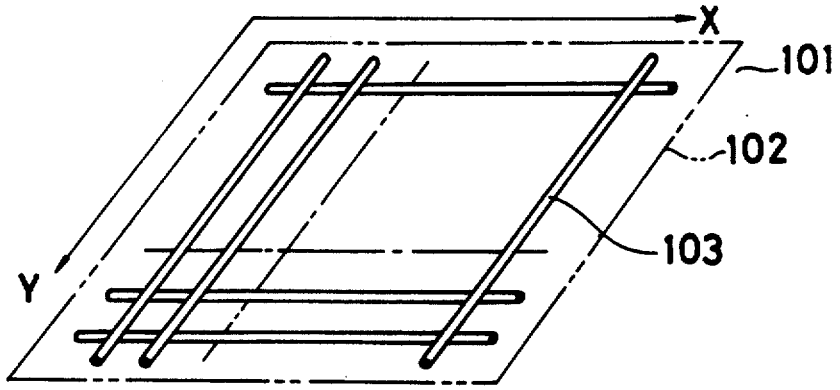
FIG. 11 is a diagram which shows an electronic blackboard in an imaginative manner.

Magnets m1, m2 are provided at the respective end portions of the eraser 107 in the longitudinal direction thereof at a predetermined interval therebetween, and when the erasing member 109 comes into contact with the writing surface 102, the magnets m1, m2 indicate the respective positions to the magnetostrictive transmission medium elements 103 in the same manner as that of the magnet 106 in FIG. 10. The respective positions indicated by the magnets m1, m2 will be hereafter called the first position and the second position, respectively.

Inclination sensors 110, 110' respectively move by means of gravity in the direction parallel with a straight line connecting the magnets m1, m2 and in the direction perpendicular to the same so as to actuate one of sensor switches 112A, 112B and one of 112A', 112B', or, when gravity does not act on the inclination sensors 110, 110', these inclination sensors are balanced by means of springs or the like in such a manner that the sensor switches will be inoperative. In this case, assuming that the writing surface 102 is used by being installed in a perpendicular or similar manner, the sensor switches 112A, 112B are inoperative when the straight line connecting the magnets m1, m2 is parallel with the X-axis of the writing surface 102, while the sensor switches 112A', 112B' are inoperative when the straight line is parallel with the X-axis. Incidentally, the data on the fact that they are inoperative is not used.

Switches SW1–SW4 for indicating end portions are installed at the respective corners of the eraser 107, and the arrangement is such that when a cut portion 113A or 113B at the respective ends of an erasing member 109 is pressed against the writing surface 102, a relevant set of switches are actuated, or, when only one corner is pressed, a relevant independent switch is actuated.

An infrared ray-transmitting portion 114 transmits infrared ray signals from four infrared ray transmitting windows 115 on the basis of various combinations of the operating conditions of the end portion-indicating switches SW1–SW4 the inclination sensors 110, 110'.

Figure 13:
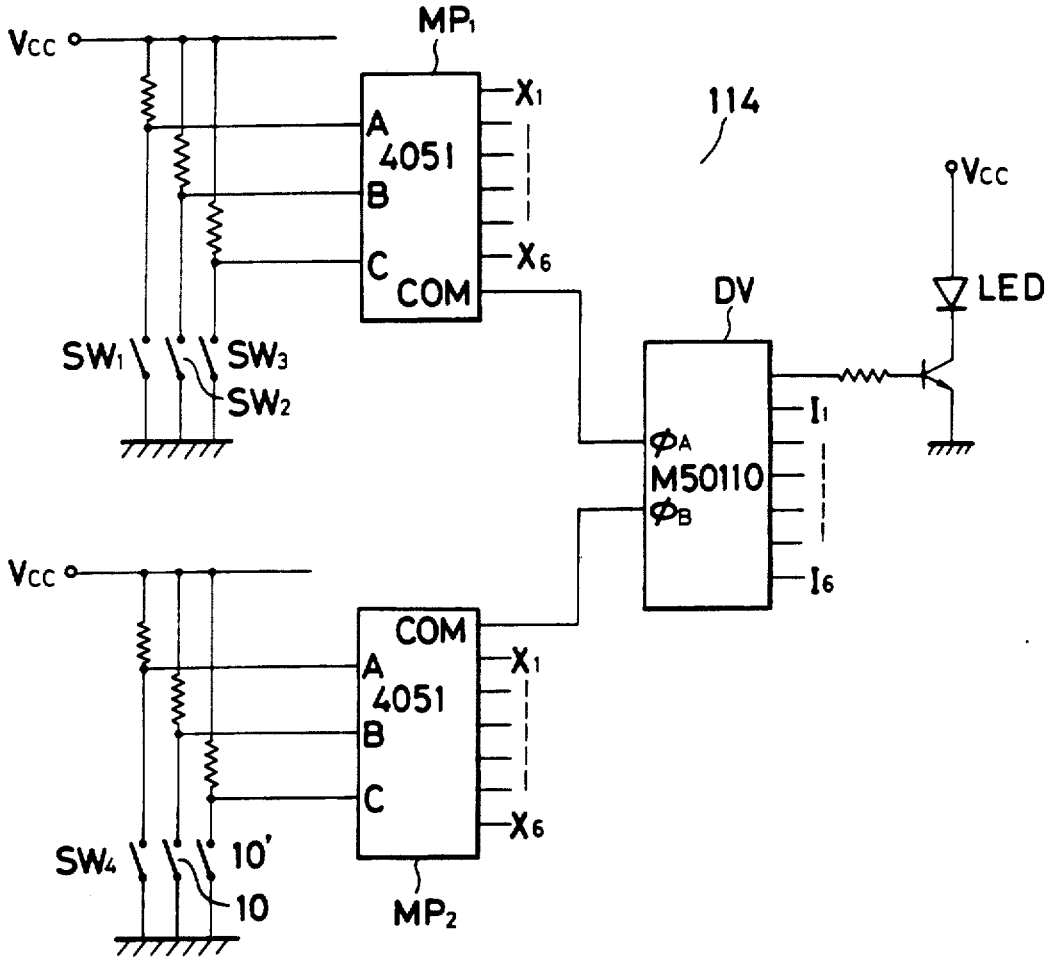
FIG. 13 is a circuit diagram of an infrared ray transmitting unit.

FIG. 13 shows a circuit diagram of the transmitting portion 114. Each multiplexor MP1, MP2 receives operating signals of the switches SW1–SW4 and the sensors 110, 110' through its respective input terminals A, B, and C. Each common terminal COM thereof is connected to respective control terminals ØA, ØB of a driver DV, while each output terminal X1–X6 for decoding the signals and outputting decoded signals is connected in parallel to input terminals I1–I6 of the driver DV. On the basis of various combinations of the input terminals A, B, and C, infrared rays peculiar to these combinations are generated from an infrared ray-emitting element LED and are transmitted through the infrared ray-transmitting windows 115.

Figure 12:
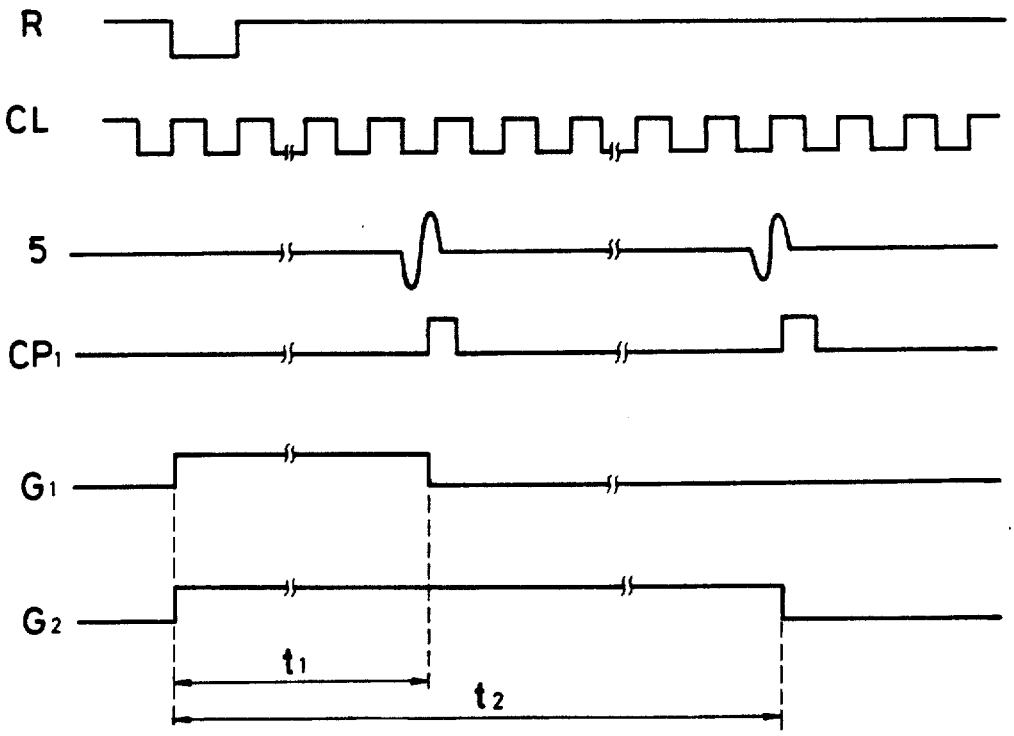
FIG. 12 is a timing chart of the operation of various portions of the circuit shown in FIG. 10.

While the eraser 107 is being used, in FIG. 10, the magnets m1, m2 are opposed to the magnetostrictive transmission medium elements 103. In a manner similar to the case where the aforementioned writing instrument is used, if a pulse is generated from the control unit CONT, the flip-flops FF1, FF2 are reset, and the counters CT1, CT2, on receiving clocks from the clock generator CL via the AND gates G1, G2, start counting the clock pulses. With reference to FIG. 12, when a time t1 has lapsed and magnetostrictive vibration waves generated by the pulses have reached the position of the magnet m1, a peak voltage is induced in the detection coils 105. At that time, the comparator CP1 assumes the "H" level. The flip-flop FF1 is then set, and the counter CT1 stops its counting. At the same time, the terminal J of the flip-flop FF2, on receiving the affirmation-side output Q of the flip-flop FF1, assumes the "H" level.

Subsequently, when a time t2 has lapsed and the magnetostrictive vibration waves have reached the position of the magnet m2, a peak voltage is induced again in the detection coils 105, which, in turn, sets the comparator CP1 in the "H" level. The flop-flop FF2 is then set, and the counter CT2 stops its counting.

The control unit computes two coordinates in the X-axis direction from the enumerated data thus obtained in the same manner as described above, and, at the same time, computes two coordinates in the Y-axis direction as well. Light-receiving portions for receiving infrared ray signals transmitted from the aforementioned infrared ray-transmitting windows 115 are provided separately in the vicinity of the writing surface 102, and the control unit CONT receives said signals.

Figure 14:
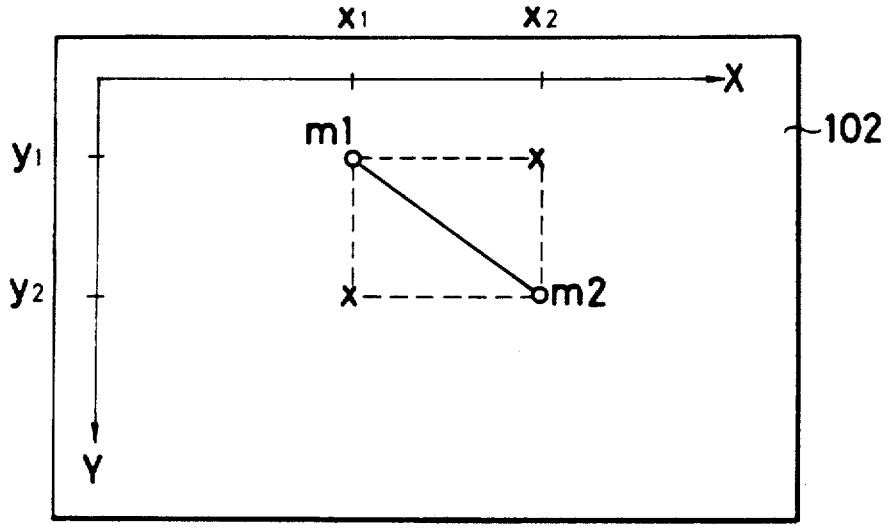
FIGS. 14(A) and 14(B) are diagrams explaining a method of discriminating the inclination of the eraser.
Figure 14:
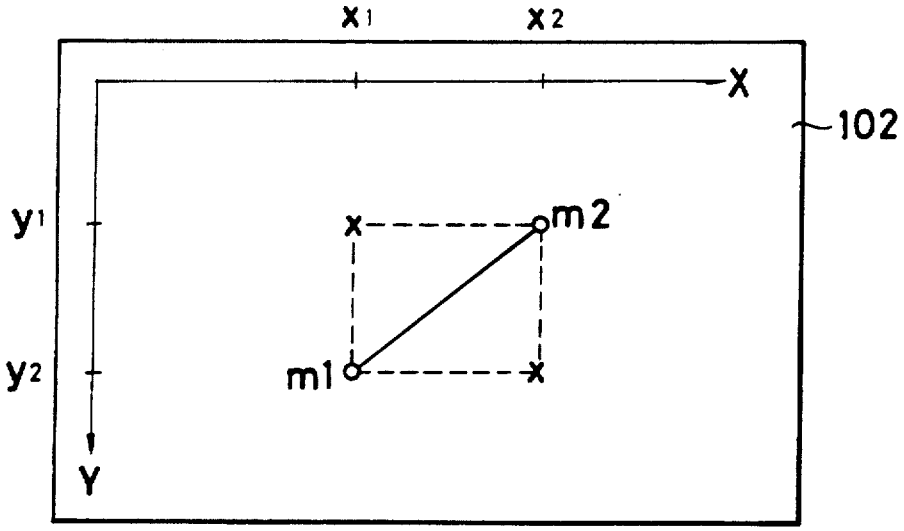

FIGS. 14(A) and 14(B) are diagrams explaining how discrimination is carried out as to which combination of the values of the two X coordinates (they will be referred to as "x1" and "x2") and the two Y coordinates (they will be referred to as "y1" and "y2") obtained by the aforementioned computation the positions of the magnets m1, m2 have been indicated.

In the case of the magnets m1, m2 shown in FIGS. 14(A) and 14(B), this is equivalent to a case where the magnets m1 and m2 in FIG. 10 are replaced by each other. However, the control unit CONT simultaneously recognizes the imaginary positions shown by crosses in FIGS. 14(A) and 14(B) since the enumerated data which it receives from the respective counters CT1, CT2 do not change.

In cases where the eraser 107 is used in a state in which a line (i.e., the reference line) connecting the magnets m1 and m2 is inclined rising to the left, as shown in FIG. 14(A), the sensor switches 112A and 112A' (or 112B and 112B') are turned on, while, when the eraser 107 is used with the line inclined rising to the right, as shown in FIG. 14(B), the sensor switches 112A and 112B' (or 112A' and 112B) are turned on.

On receiving infrared ray signals based on the operating conditions of the inclination sensors 110, 110', the control unit CONT discriminates in which state of FIG. 14(A) or 14(B) the magnets m1, m2 are placed. Meanwhile, the control unit CONT further computes the directions of the two kinds of reference lines obtained from the combinations of the aforementioned two X coordinates and two Y coordinates, and decides that the combinations in which these directions coincide with each other are correct.

In cases where a figure drawn by the writing instrument on the writing surface 102 is to be erased, erasing is effected by operating and moving the eraser 107. However, the positions of the moving magnets m1, m2 are also detected in a manner similar to that described above. The control unit CONT establishes as a first erasure region a region surrounded by the positions of the magnets m1, m2 during starting of movement and by the subsequently obtained positions of the magnets m1, m2 as well as a region determined by the area of the erasing member 109. Subsequently, the control unit CONT consecutively establishes as second, third, . . . erasure regions a region surrounded by the positions of the magnets m1, m2 obtained consecutively in correspondence with the movement of the eraser 107 and by the positions of the magnets m1, m2 obtained immediately before them.

In cases where only one end or one portion of the erasing member 109 is used, a region which is determined by the position of the magnet m1 (or m2) in accordance with infrared ray signals based on the on-off operations of the switches SW1-SW4 as well as the size of the erasing member 109 is established as an erasure region.

It should be noted that, when the inclination sensor 110 or 110' is parallel with the X-axis of the writing surface and the slider 111 or 111' is in equilibrium, each one of the X or Y coordinates at the positions of the magnets m1, m2 is mutually common, so that coordinates each marked with a cross in FIGS. 14(A) and 14(B) do not exist, and, hence, the aforementioned discrimination is not necessary.

According to this embodiment, the use of the eraser is facilitated by making it rectangular or in a similar shape, so that it is possible to detect a range of erasure corresponding to the shape of the eraser.

Figure 15:
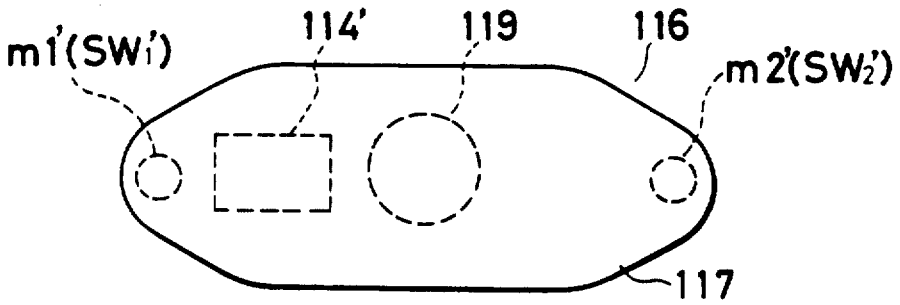
FIGS. 15(A) and 15(B) are schematic diagrams illustrating an eraser in accordance with a third embodiment of the present invention.
Figure 15:
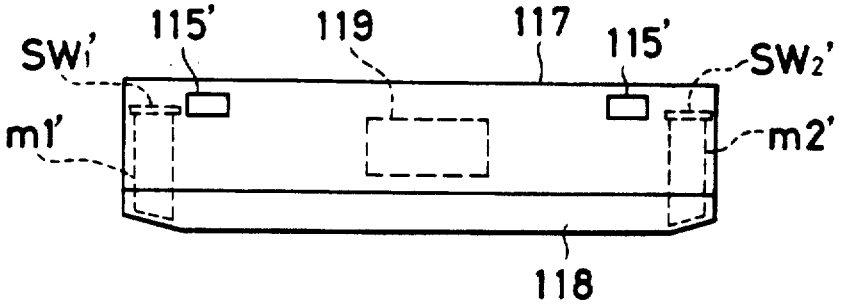

FIG. 15 illustrates a schematic diagram of an eraser in accordance with a third embodiment of the present invention. An eraser 116 has the shape of a ship, and magnets m140 , m2' and switches SW1', SW2' for indicating respective end portions are provided in the vicinity of the opposite end portions of a case 117, respectively.

Figure 16:
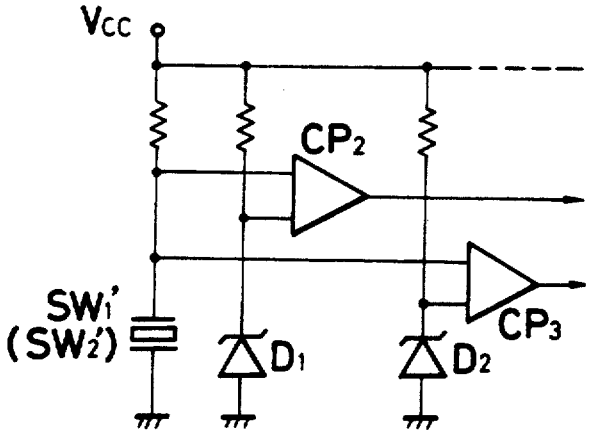
FIG. 16 is a circuit diagram relating to switches for indicating end portions shown in FIGS. 15(A) and 15(B)

The switches SW1', SW2' are pressure-sensitive switches using conductive rubber sheets, as their basic principle is shown in FIG. 16. If either of the switches SW1', SW2' is pressed against the writing surface, an energizing electric current increases in accordance with an amount of pressing. Comparators CP2, CP3 receive mutually different reference levels by means of Zener diodes D1, D2, respectively, and fetch two data on sensed pressure corresponding to compression by the erasing member 118. An infrared ray-transmitting portion 114' transmits infrared ray signals from infrared ray-transmitting windows on the basis of these data in a manner similar to that for the eraser 107. In effecting data processing in this case, under the assumption that an erasing member 118 comes into contact at its end portions substantially in a circular shape, a measure is taken by enlarging a concentric circle. Incidentally, when both of the switches SW', SW2' are turned on, a range of erasure similar to that of the eraser 107 is established.

Figure 17:
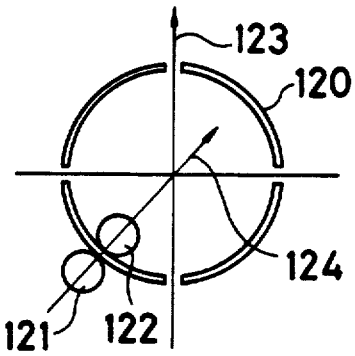
FIG. 17 is a structural diagram of an inclination sensor shown in FIGS. 15(A) and 15(B)

An inclination sensor 119 in FIG. 15 is arranged such that, as shown in FIG. 17, two cylindrical magnets 121, 122 roll by means of gravity along the periphery of quadrisected segments of cylindrical pressure-sensitive rubber provided with a planar electrode on both external and internal surfaces thereof, while clamping said periphery. The central axis of the cylinder is perpendicular to the underside of the erasing member 118, and a straight line 123 which passes through the divided portions of the pressure sensitive rubber 120 and intersects the central axis at right angles is made to correspond with the longitudinal axis of the eraser 116.

As a result, when the longitudinal axis of the eraser 116 is parallel with the X-axis or the Y-axis of the writing surface 102, a perpendicular line 124 coincides with the straight line 123, and the magnets 121, 122 are located at the divided portion. However, if the longitudinal axis of the eraser 116 deviates from the same, the magnets 121, 122 clamp one of the segments, as shown in FIG. 17, and the inclination can be discriminated in a manner similar to that of the eraser 107.

Incidentally, cylindrical members (not shown) for guiding the magnets 121 and 122 are respectively provided on the outer and inner sides of the pressure-sensitive rubber 120.

Figure 18:
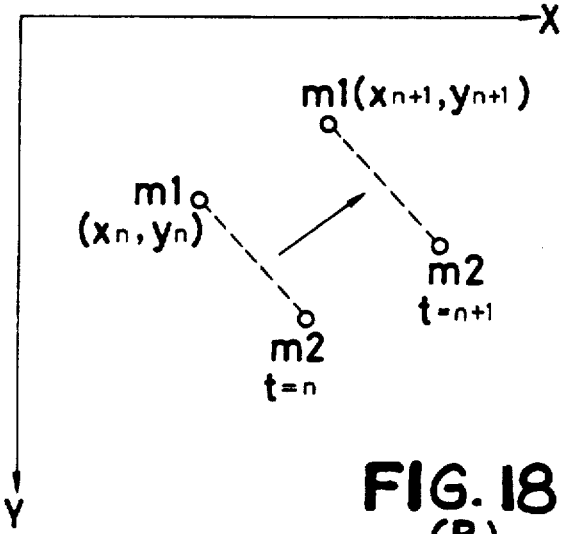
FIGS. 18(A) and 18(B) are diagrams explaining a method of discriminating the inclination of the eraser without using the inclination sensor.
Figure 18:
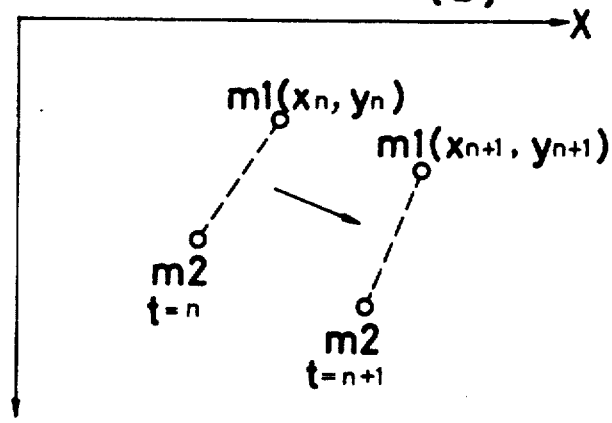

FIGS. 18(A) and 18(B) are diagrams explaining a method of discriminating the inclination from the state of movement of the magnets m1, m2 without using the inclination sensors. The control thereof is effected by the control unit CON shown in FIG. 10. Since the eraser 107 is generally used by moving the same on the writing surface 102 in the direction perpendicular to the longitudinal axis of the eraser 107, discrimination of the inclination can be effected as follows: Differences in X coordinates and Y coordinates of the respective magnets m1 and m2 in a time interval between the time $t=n$ to the time $t=n+1$, are determined. If, for instance, $xn-xn+1<0$, and $yn-yn+1>0$ with respect to the magnet m1, as shown in FIG. 18(A), a judgment is made that the straight line is inclined downwardly to the left. Meanwhile, if $xn-xn+1<0$, and $yn-yn+1<0$, as shown in FIG. 18(B), a judgment is made that the straight line is inclined downwardly to the right. In other words, a product of the difference between the X coordinate and the Y coordinate is calculated, and when the product is negative, a judgment is made that the straight line is inclined downwardly to the left, and when positive, a judgment is made that it is inclined downwardly to the right. Incidentally, with respect to the establishment of a range of erasure, the same procedure as that described before applies.

According to this embodiment, when the eraser is used partially, it is possible to detect a range of erasure by the turning on and off of the switches, so that it is possible to provide an eraser outstanding in the operational feature.

What is claimed is:

1. An electronic blackboard apparatus, comprising:

an electronic blackboard unit having a surface plate made of a non-magnet material, the surface of which is formed as a writing surface capable of being used repeatedly, and a position-detecting tablet for detecting position coordinates of a local magnetic bias applied via said surface plate;

a writing instrument having a core member for displaying video information including characters and figure on said writing surface and a magnetism generator for applying a magnetic bias to said position-detecting tablet when said core member is in contact with said writing surface;

an eraser having an erasing member for erasing said video information including said characters and figure on said writing surface and a magnetism generator for applying a magnetic bias to said position-detecting tablet when said erasing member is in contact within said writing surface;

a position detecting control unit for driving said position-detecting tablet and for computing the position coordinates of said writing instrument and said eraser; and an output section for outputting said video information of said writing surface.

2. An electronic blackboard apparatus according to claim 1, wherein said position-detecting tablet is comprised of:

first magnetostrictive transmission medium elements constituting an assembly of a plurality of magnetostrictive transmission medium elements, each of which is located on the rear side of said surface plate, is arranged in parallel with each other, and constitutes a first array layer substantially parallel with said writing surface on said rear side of said surface plate;

second magnetostrictive transmission medium elements having an arrangement equivalent to that of said first magnetostrictive transmission medium elements and constituting a second array layer superposed on said first array layer, each of said second magnetostrictive transmission medium elements being substantially perpendicular to said first magnetostrictive transmission medium elements;

exciting coils constituted by a set of coils wound around each end of said first magnetostrictive transmission medium elements and adapted to commonly excite said each end and a coil wound around each end of said second magnetostrictive transmission medium elements and adapted to commonly excite said each end; and detection coils constituted by a set of coils respectively wound around each of said first magnetostrictive transmission medium elements over the entire length thereof and adapted to fetch induced voltages based on magnetostrictive vibration waves in said first magnetostrictive transmission medium elements and coils respectively wound around each of said second magnetostrictive transmission medium elements over the entire length thereof and adapted to fetch induced voltages based on magnetostrictive vibration waves in said second magnetostrictive transmission medium elements; and said position-detecting control unit is comprised of:

a pulse oscillator for supplying a pulse current to said exciting coils at an appropriate timing; and a computing unit for measuring a time from the time of said excitation until the time of fluctuations in said induced voltages of said detection coils on the basis of said fluctuations at the time when said magneto-vibration waves generated from said each end of said first or second magnetostrictive transmission medium elements reach the position of contact of said writing instrument at the time of said excitation.

3. An eraser for use with an electronic blackboard in which each position in a writing region is defined by X coordinates and Y coordinates using each one end of said writing region in the X- and Y-directions as reference positions and reaching each other end thereof, a writing position is indicated with the use of a writing instrument, and a written image is processed electronically, said eraser comprising:

position-indicating means provided at the vicinity of opposite end portions of the surfaces of an erasing member contacting a writing surface and adapted to indicate first and second positions; and inclination-discriminating means for discriminating to which side a straight line connecting said first and second positions is inclined using an X-axis or a Y-axis on said writing surface as a reference line.

4. An eraser for use with an electronic blackboard in which each position in a writing region is defined by X coordinates and Y coordinates using each one end of said writing region in the X- and Y-directions as reference positions and reaching each other end thereof, a writing position is indicated with the use of a writing instrument, and a written image is processed electronically, said eraser comprising:

position-indicating means provided at the vicinity of opposite end portions of the surfaces of an erasing member contacting a writing surface and adapted to indicate first and second positions;

inclination-discriminating means for discriminating to which side a straight line connecting said first and second positions is inclined using an X-axis or a Y-axis on said writing surface as a reference line; and at least two switches actuating when said erasing member comes into contact with said writing surface and adapted to indicate an erasing position by a combination with an indication of said position-indicating means.

5. An eraser for an electronic blackboard according to claim 4, wherein a switch for obtaining a signal corresponding to a pressing force is used to enlarge or reduce the region of an erasing portion in correspondence with said pressing force.

*6. An eraser for removing a line from a display surface on which the line is written while signalling the location of the eraser to a position detector for an implement, the detector establishing magnetic fields for position detection, comprising a housing, the housing including:*

*an exterior eraser surface for enabling the line to be erased from the display surface,*

*a structure positioned behind and in proximity to the eraser surface for deriving a field that interacts with the position detector to enable the position detector to derive signals for indicating the eraser position on the display surface, and*

*switch means activated in response to the eraser surface being in an erase position on the display surface for causing a response to be coupled from the housing to the detector to indicate the presence of the eraser surface on the display surface.*

*7. The eraser of claim 6 wherein the structure is not powered by an electric power supply.*

*8. The eraser of claim 7 wherein a pair of said structures are provided in proximity to opposite ends of the eraser surface, each of said structures deriving a separate field that separately interacts with the detector to provide an indication of the region spanned by the eraser surface between the opposite ends thereof.*

*9. The eraser of claim 8 wherein a separate pressure responsive switch is associated with each of said structures, said switches being arranged so that (a) both of said switches are activated to a first state in response to the eraser surface between the structures being pressed flat against the display surface, and (b) only the switch in proximity to one of said ends is activated to the first state in response to said end being pressed against the display surface to the exclusion of the other of said ends.*

*10. The eraser of claim 6 wherein a pair of said structures are provided in proximity to opposite ends of the eraser surface, each of said structures deriving a separate field that separately interacts with the detector to provide an indication of the region spanned by the eraser surface between the opposite ends thereof.*

*11. In combination, a writable and erasable display surface on which lines can be mechanically written and erased, a two coordinate position detector for an implement positioned on the display surface, said detector including means for establishing position detecting magnetic fields in the two coordinate directions,*

*a pen for inscribing a line on the display surface, the pen including:*

*a marker material for enabling a line to be drawn on the display surface,*

*a first structure for deriving a first field that interacts with the detector to enable the position detector to derive signals indicative of the pen position on the display surface, and*

*first switch means activated in response to the marker material being in a write position on the display surface for causing a response to be coupled from the pen to the detector to indicate the presence of the marker material on the display surface;*

*an eraser including:*

*an eraser surface for enabling the line to be erased from the display surface,*

*a structure positioned behind and in proximity to the eraser surface for deriving a second field that interacts with the position detector to enable the position detector to derive signals for indicating the eraser position on the display surface,*

*second switch means activated in response to the eraser surface being in an erase position on the display surface for causing a response to be coupled from the housing to the detector to indicate the presence of the eraser surface on the display surface, and*

*means responsive to the signals for deriving an output signal indicative of the position of the line mechanically written on the display surface as modified by the position of the eraser surface on the display surface.*

*12. The combination of claim 11 further including a two-coordinate display responsive to the output signal for displaying the line written on and erased from the display surface.*

*13. The combination of claim 11 wherein said structures in the pen and eraser are not powered by an electric power supply.*

*14. The combination of claim 11 wherein said eraser includes a pair of said structures in proximity to opposite ends of the eraser surface, each of said structures deriving a separate field that separately interacts with the detector to provide an indication of the region spanned by the eraser surface between the opposite ends thereof, said detector and signal deriving means being responsive to the separate fields so the output signal is indicative of the span of the eraser surface between the opposite ends thereof.*

*15. The combination of claim 14 wherein said eraser includes a separate pressure responsive switch associated with each of said structures, said switches being arranged so that (a) both of said switches are activated to a first state in response to the eraser surface between the structures being pressed flat against the display surface, and (b) only the switch in proximity to one of said ends is activated to the first state in response to said end being pressed against the display surface to the exclusion of the other of said ends, said detector and signal deriving means being responsive to separate responses derived in response to different combinations of the switches being activated to the first state.*

*16. The combination of claim 14 further including a two-coordinate display responsive to the output signal for displaying the line written on and erased from the display surface.*

*17. The combination of claim 11 further including a display for forming an image of a replica of the drawn and erased line in response to the output signal.*

*18. A method of drawing and erasing a line on a display surface and for deriving a signal indicative of the drawn line image as affected by the erasing operation, a field sensing two-coordinate position detector being associated with the display surface, comprising the steps of*

*(1) drawing the line with a pen having (a) a marker for the surface (b) a first magnetic field affecting structure, and (c) a first pressure responsive switch,*

*(2) erasing at least a portion of the drawn line with an eraser for the line drawn by the marker on the display surface, the eraser including a second magnetic field affecting structure and a second pressure responsive switch,*

*(3) activating the first switch to a first state during step (1) so that a first response is derived as the magnetic field of the first structure is interacting with the field sensing detector,*

*(4) activating the second switch to a first state during step (2) so that a second response is derived as the magnetic field of the second structure is interacting with the field sensing detector, and*

*(5) responding to the first and second responses and the interaction of the magnetic fields of the first and second structures with the field sensed by the position detector to derive the signal.*

*19. The method of claim 18 wherein the eraser includes a pair of said structures in proximity to opposite ends of the*

*eraser surface, responding to separate interactions between said pair of structures and the field sensors of the position detector while said eraser surface is pressed against the display surface to activate the switch means of the eraser to modify the signal to indicate that the distance spanned by the eraser between the ends thereof is not part of the line.*

*20. The method of claim 18 further comprising sequentially energizing magnetic fields in said coordinate directions, the structures interacting with the magnetic fields to modify the magnetic fields as a function of the pen and eraser positions, the signal being derived in response to the modified magnetic fields.*

*21. The method of claim 18 further including displaying a replica of the drawn and erased line in response to the signal.*

*22. An eraser comprising a housing, the housing including:*

*an exterior eraser surface for erasing a line drawn with a marker from a display surface,*

*a pair of magnetic field affecting structures in proximity to opposite ends of the eraser surface, and*

*a switch associated with each of said structures, said switches being arranged so that (a) both of said switches are activated to a first state in response to the eraser surface between the structures being pressed flat against the display surface, and (b) only the switch in proximity to one of said ends is activated to the first state in response to said end being pressed against the display surface to the exclusion of the other of said ends.*

*23. The eraser of claim 22 further including means responsive to different combinations of the switches being activated to the first state for deriving different responses indicative of the different combinations of the switches.*

*24. An implement for mechanically inscribing or mechanically erasing a line on a display surface while simultaneously enabling the position of the implement to be signalled to a tablet including two coordinate direction magnetic field responsive elements, the implement comprising a housing, the housing including:*

*a first structure at one region of the housing adapted to bear against the display surface for mechanically changing an image on the display surface while the one region bears against the display surface,*

*a second structure in proximity to the one region for affecting the magnetic field responsive elements of the tablet while the one region bears against the display surface, and a pressure responsive switch coupled with said one region so that the switch is activated from a normal state to another state in response to the one region bearing against the display surface.*

*25. The implement of claim 24 wherein the housing is formed as a pen and the first structure includes material for mechanically marking the display surface.*

*26. The implement of claim 24 wherein the housing is formed as an eraser and the first structure includes material for mechanically erasing a mechanical image from the display surface.*

*27. The implement of claim 26 wherein a pair of said first structures are provided in proximity to opposite ends of the eraser surface, each of said structures deriving a separate field that separately interacts with the detector to provide an indication of the region spanned by the eraser surface between the opposite ends thereof.*

*28. The implement of claim 27 wherein a separate pressure responsive switch is associated with each of said structures, said switches being arranged so that (a) both of said switches are activated to a first state in response to the eraser surface between the structures being pressed flat against the display surface, and (b) only the switch in proximity to one of said ends is activated to the first state in response to said end being pressed against the display surface to the exclusion of the other of said ends.*

*29. The implement of claim 24 wherein the second structure is not powered by an electric power supply.*

*30. The implement of claim 29 wherein the second structure supplies a magnetic field to the magnetic field responsive elements of the tablet.*

*31. The combination of claim 11 wherein said two coordinate position detector includes means for deriving a magnetic field, said eraser and pen including structures for modifying the magnetic field derived by the position detector, the position detector including means for sensing the modified magnetic field and for deriving a signal indicative of the location of the modified magnetic field.*

*32. The combination of claim 31 wherein said magnetic field deriving means includes, for each coordinate direction, plural magnetostrictive transmission lines and means for inducing an AC magnetic field in each of said lines.*

*33. The combination of claim 32 wherein the magnetostrictive lines for each separate coordinate direction are parallel to each other, the lines for the two directions being at right angles to each other.*

*34. The combination of claim 32 wherein the means for inducing includes an exciting coil at one end of each of said lines.*

*35. The combination of claim 34 wherein the same exciting coil is wound on each of said lines in each of said coordinate directions so as to commonly excite the different lines in each of said coordinate directions.*

*36. The combination of claim 35 further including a bias magnet for each of said lines.*

*37. The combination of claim 32 wherein the means for sensing the modified magnetic field includes a detecting coil on each of said lines.*

*38. A method of causing a line to be written on and erased from a display in response to signals derived from movement relative to a tablet of first and second implements associated with writing and erasing on the display, a field sensing two-coordinate position detector being associated with the tablet, the first and second implements respectively having first and second magnetic field affecting structures and first and second switches comprising the steps of:*

*activating the first switch to a first state as the first implement is being moved in proximity to the tablet so that a first response is derived as the magnetic field affecting structure of the first implement is interacting with the field sensing detector,*

*activating the second switch to a first state as the second implement is being moved in proximity to the tablet so that a second response is derived as the magnetic field affecting structure of the second implement is interacting with the field sensing detector,*

*responding to the first and second responses to derive the signals, and*

*responding to the signals to reproduce on the display a replica of the movement of the first implement as modified by movement of the second implement such that movement of the first implement is displayed on the display as a written image and movement of the second implement results in eraser of the written image at positions of the second implement overlapping positions of the first implement while the first and second switches are activated to the first state.*

*39. In combination,*

*a two-coordinate display on which lines can be written and erased,*

*a tablet including a two-coordinate position detector for implements positioned in proximity to the tablet, said detector including means for establishing position detecting magnetic fields in the two coordinate directions,*

*a first implement associated with writing an image on the display, the first implement including:*

*a first switch adapted to be activated while the first implement is in proximity to the tablet, and*

*a first structure affecting the detector position detecting magnetic fields while the first implement is in proximity to the tablet;*

*a second implement associated with erasing an image from the display, the second implement including a second switch adapted to be activated while the second embodiment is in proximity to the tablet;*

*a second structure affecting the detector position detecting magnetic fields while the second implement is in proximity to the tablet; and*

*means responsive to magnetic field responses from the detector while the implements are moved in proximity to the tablet and while the switches are closed for activating the display so that a replica of the movement of the first implement in proximity to the tablet while the first switch is activated is written as an image on the display and the written image is erased from a portion of the display corresponding with the second implement overlapping the first implement while the second switch is activated in response to movement of the second implement in proximity to the tablet while the second switch is activated.*

*40. The combination of claim 39 wherein the first and second implements are cordless.*

* * * * *